(12) United States Patent
Bakke et al.

(10) Patent No.: US 8,156,230 B2
(45) Date of Patent: *Apr. 10, 2012

(54) OFFLOAD STACK FOR NETWORK, BLOCK AND FILE INPUT AND OUTPUT

(75) Inventors: Mark Bakke, Maple Grove, MN (US);
Timothy Kuik, Lino Lakes, MN (US);
David Thompson, Rogers, MN (US);
Paul Gleichauf, Saratoga, CA (US);
Xiaoxue Ma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,304

(22) Filed: Mar. 22, 2011

(65) Prior Publication Data

US 2011/0173295 A1 Jul. 14, 2011

Related U.S. Application Data

(63) Continuation of application No. 11/472,678, filed on Jun. 21, 2006, now Pat. No. 7,949,766.

(60) Provisional application No. 60/693,133, filed on Jun. 22, 2005.

(51) Int. Cl.
*G06F 15/16* (2006.01)
(52) U.S. Cl. .......... 709/228; 709/250
(58) Field of Classification Search ............ 709/228, 709/250
See application file for complete search history.

(56) References Cited

U.S. PATENT DOCUMENTS

| 6,967,954 | B2 * | 11/2005 | Sugiyama | 370/395.52 |
|---|---|---|---|---|
| 7,305,681 | B2 * | 12/2007 | Khartabil | 719/328 |
| 7,373,646 | B1 * | 5/2008 | Smith | 718/108 |
| 2001/0005381 | A1 * | 6/2001 | Sugiyama | 370/466 |
| 2002/0143962 | A1 * | 10/2002 | Carter | 709/229 |
| 2004/0039672 | A1 * | 2/2004 | Zivic et al. | 705/36 |

(Continued)

FOREIGN PATENT DOCUMENTS

EP 1460805 A2 11/2004

OTHER PUBLICATIONS

EP Office Communication, application serial No. EPO 06 785 699.7 dated Aug. 22, 2011 (6 pgs).

(Continued)

*Primary Examiner* — Patrice Winder
*Assistant Examiner* — Ebrahim Golabbakhsh
(74) *Attorney, Agent, or Firm* — Hickman Palermo Truong & Becker LLP

(57) ABSTRACT

An apparatus for offloading network, block and file functions from an operating system comprises a network interface coupled to a network for receiving packet flows; one or more processors each having one or more processor cores; a computer-readable medium carrying one or more operating systems and an input/output networking stack which are hosted in one or more of the processor cores. The networking stack is shared among the operating systems. The networking stack comprises instructions which when executed cause receiving a request for data transfer from one of the operating systems at internal network, block and file system interfaces, and permitting data to be transferred between the internal interfaces and a plurality of external interfaces by preventing the operating systems from performing the data transfer and performing the data transfer on behalf of the operating systems.

20 Claims, 12 Drawing Sheets

U.S. PATENT DOCUMENTS

| | | | |
|---|---|---|---|
| 2004/0230794 A1* | 11/2004 | England et al. | 713/164 |
| 2004/0250253 A1* | 12/2004 | Khartabil | 719/310 |
| 2006/0104295 A1 | 5/2006 | Worley et al. | |
| 2007/0260920 A1* | 11/2007 | Turner et al. | 714/17 |

OTHER PUBLICATIONS

Current claims for application serial No. EPO 06 785 699.7, 4 pages, dated Aug. 2011.
Microsoft TechNet, The Cable Guy—Sep. 2005—Next Generation TCP/IP Stack in Windows Vista and Windows Server "Longhorn", Published Aug. 29, 2005, Updated May 23, 2005, pp. 1-4.
Microsoft Windows Hardware Developer Central, WinHEC 2006 Conference Sessions, "System Fundamentals—Virtualization", htpp://www.microsoft.com/whdc/winhee-/trackdetail06.
mspx?track=3, printed Sep. 20, 2006, pp. 1-3.
M. Neil, "Hypervisor, Virtualization Stack, and Device Virtualization Architectures" Microsoft Corporation, 2006, printed Sep. 20, 2006, pp. 1-6.
VMware Infrastructure 3 Transform IT Infrastructure with Enterprise-Class Virtualization, 2006, http://www.vmware.com/products/vi/ printed Sep. 20, 2006, pp. 1-5.
Knowles, Mike, "Survey of the Storage Evolution," Proceedings of the 2003 User Group Conference, Jun. 9, 2003, XP010674984, pp. 362-367.
Rangarajan, Murali, "TCP Servers: Offloading TCP Processing in Internet Servers, Design, Implementation, and Performance," Mar. 2002, http://discolab.rutgers.edu/split-os/dcs-tr-481.pdf, Jun. 29, 2004, XP002286342, pp. 1-14.
International Searching Authority, "Notification of Transmittal of the International Search Report and the Written Opinion of the International Searching Authority, or the Declaration," PCT/US2006/025078, dated Nov. 24, 2006, 14 pages.
Current Claims, PCT/US2006/025078, 6 pages.
"TCP Servers: Offloading TCP Processing in Internet Servers. Design, Implementation, and Performance", dated Mar. 15, 2002, 23 pages.
State Intellectual Property Office of the People'S Republic of China, "The First Office Action", filing No. 200680014763.5, Issued Oct. 24, 2008, 13 pages (with translation).
Claims, filing No. 200680014763.5, 3 pages.
Regnier, G. et al., "ETA: experience with an Intel® Xeon™ processor as a packet processing engine", Proceedings of the 11th Symposium on High Performance Interconnects, IEEE, Aug. 20, 2003, 7 pages.
VMware, Inc. "VMware Virtual SMP", Product Datasheet, Copyright 2004, 1 page.
IBM Corporation, "Logical Partition Security in the IBM @server pSeries 690", dated Feb. 15, 2002, 13 pages.
Microsoft Corporation, "Windows Network Task Offload", Device Fundamentals/Networking and Communications, dated Dec. 4, 2001, 4 pages.
State Intellectual Property Office of the People'S Republic of China, "The Second Office Action", filing No. 200680014763.5, Issued Apr. 24, 2009, 7 pages (with translation).
Current Claims, Chinese patent application filing No. 200680014763.5, 4 pages.
EP Office Action, application serial No. EPO 06 785 699.7 dated Mar. 29, 2010 (pp. 1-3).
Current claims for application serial No. EPO 06 785 699.7 (pp. 1-4).
Microsoft Corporation, "Microsoft Windows Scalable Networking Initiative", http://www.microsoft.com/whdc/device/network/scale.mspx, WinHEC 2004 Version, Apr. 13, 2004, 11 pages.
Currid, A., "TCP Offload to the Rescue", ACM Queue, May 2004, pp. 58-65.
EP Communication Pursuant to Art. 94(3), application serial No. EPO 06 785 699.7 dated Jan. 18, 2011 (pp. 1-3).

* cited by examiner

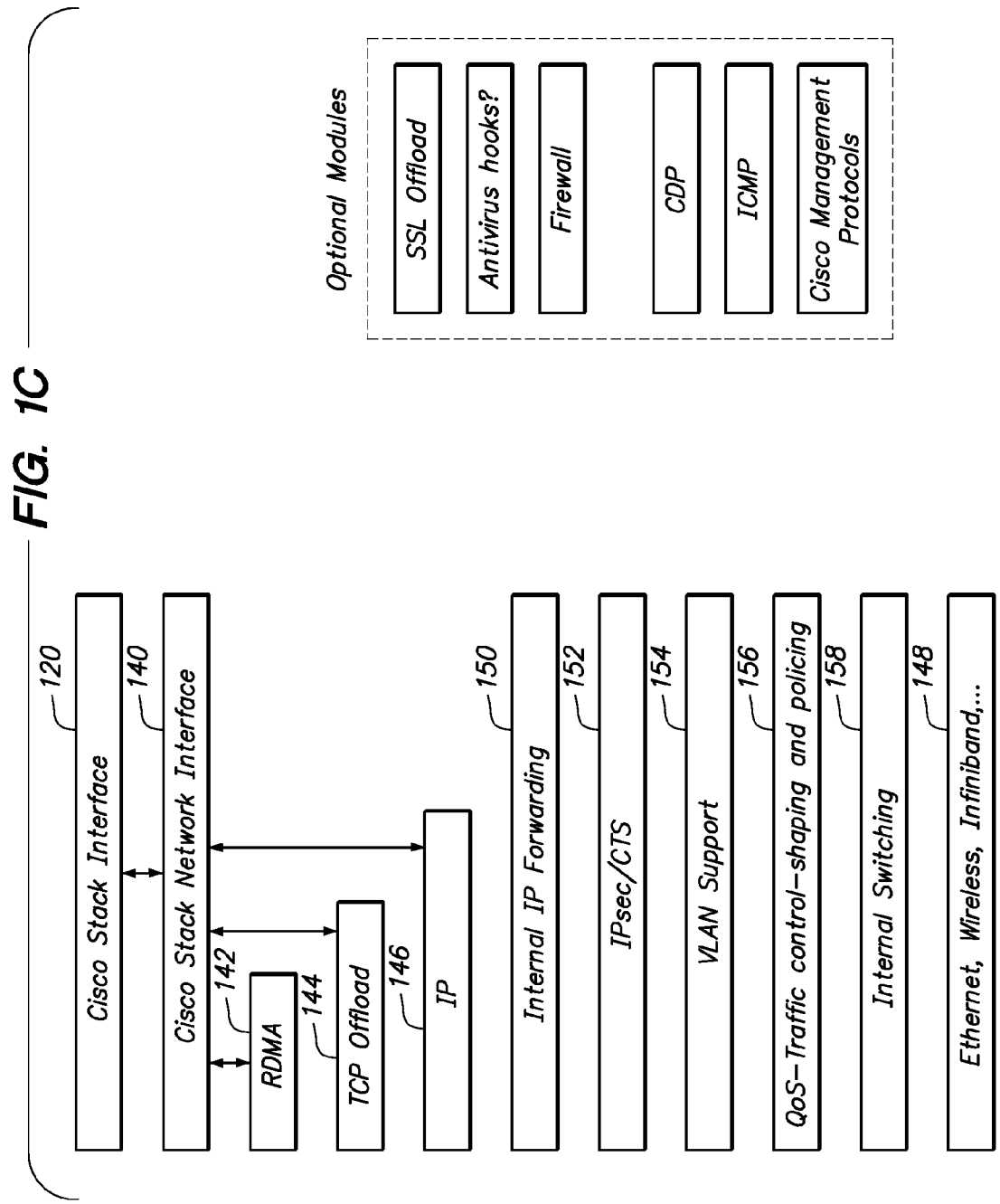

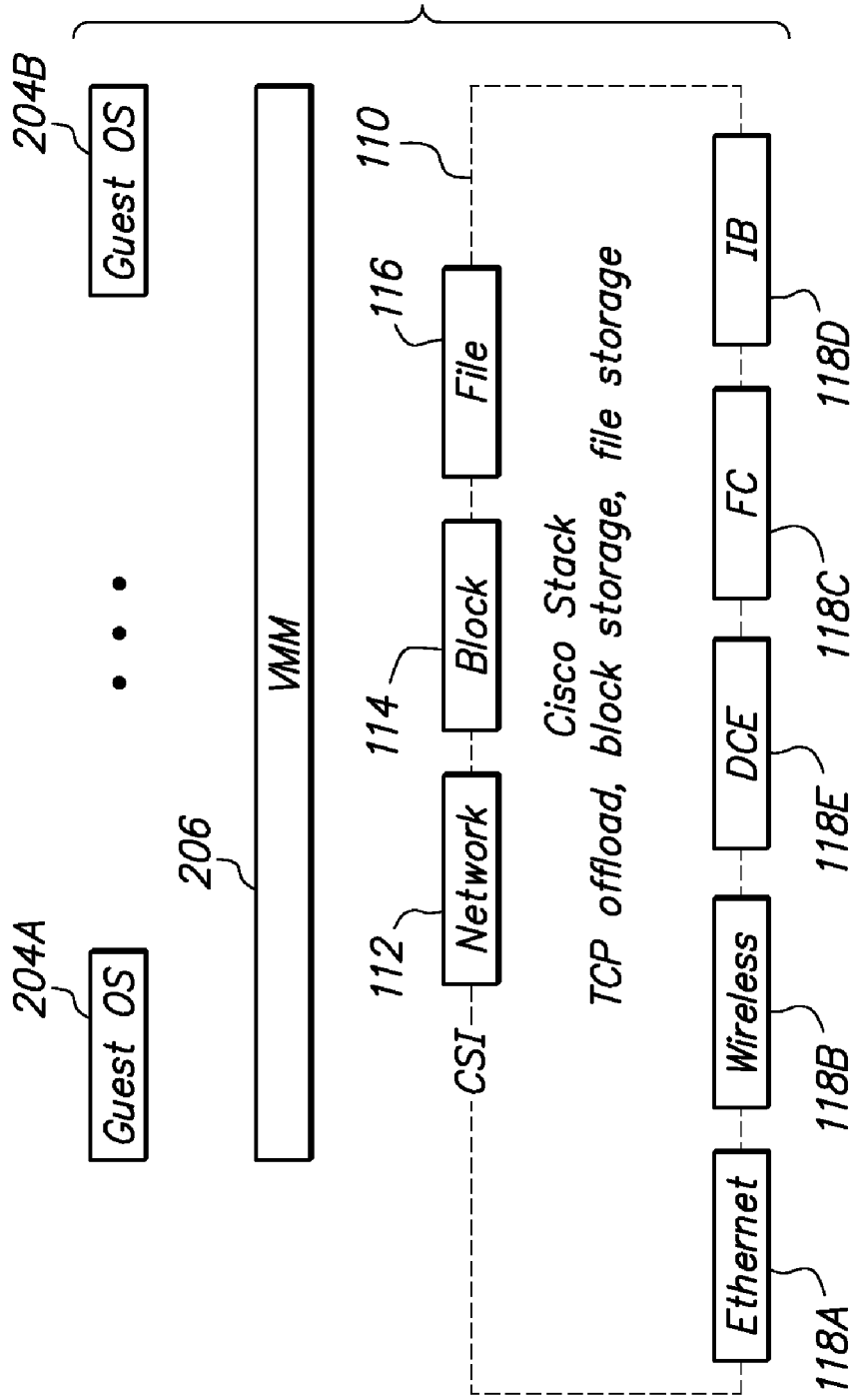

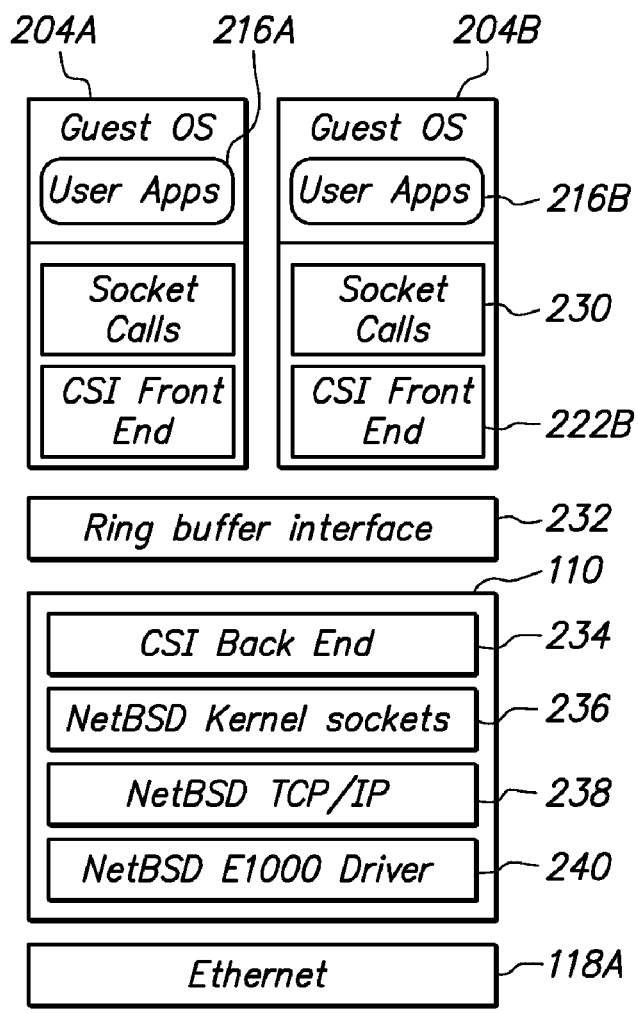

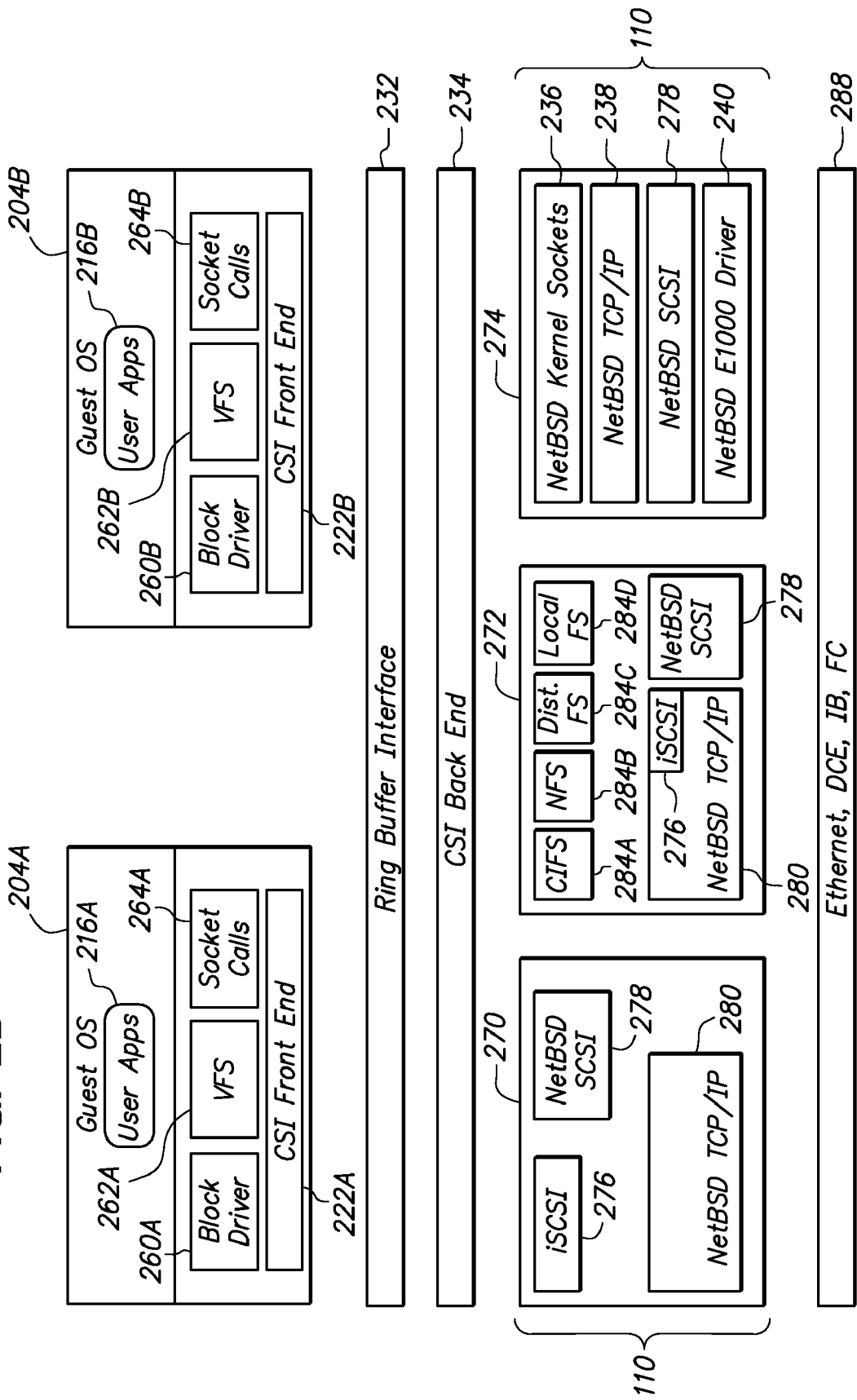

OFFLOAD STACK FOR NETWORK, BLOCK AND FILE INPUT AND OUTPUT

PRIORITY CLAIM; CROSS-REFERENCE TO RELATED APPLICATIONS

This application claims benefit and priority under 35 U.S.C. §120 as a Continuation of U.S. patent application Ser. No. 11/472,678, which is entitled "OFFLOAD STACK FOR NETWORK, BLOCK AND FILE INPUT AND OUTPUT" and was filed by Mark Bakke et al. on Jun. 21, 2006 now U.S. Pat. No. 7,949,766, the entire contents of which is hereby incorporated by reference as if fully set forth herein, and which claims priority and benefit under 35 U.S.C. §119(e) of U.S. Provisional Application No. 60/693,133, filed on Jun. 22, 2005, the entire contents of which is hereby incorporated by reference as if fully set forth herein. The applicants hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to interfacing computer systems to networks. The invention relates more specifically to approaches for offloading certain network, block and file interfacing tasks from endpoint hosts.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Developers of computer systems that are intended for use in arbitrary locations in a network, such as servers, workstations, printers and other endpoint hosts, face at least three significant systems-level requirements for external communications: security, performance and management. These requirements are addressed in a set of software components termed a "networking stack" on the endpoint hosts. Relatively secure high-performance open source implementations of networking stacks are provided in BSD-based implementations of the UNIX operating system, such as FreeBSD, OpenBSD, NetBSD. Other implementations of networking stacks are also known and include Linux, HPUX, Microsoft Windows, Sun Solaris and IBM AIX.

Security solutions need to monitor the behavior of network traffic. The evolution of security attacks and countermeasures requires a flexible platform that can be easily extended and even replaced to enable countermeasures to attacks. Achieving both performance and security is practical only with a unified system of network management of the interfaces and their security properties. Network gear vendors and operating system providers are struggling to provide security for bridging behavior in which packets are snooped from one interface and broadcast out another. Vendors also are challenged to control the ability of platforms running multiple operating system (OS) images when one OS image seeks to modify another.

The security applications that rely on access to the networking stack includes virtual private networking, antivirus, inline encryption and message integrity, network discovery, and identity protocols. Each of these applications requires management, especially where they cross boundaries. A unified management interface is practically necessary for these systems to work together.

Concurrently, the growth of communications between computing platforms has led to commensurate growth in the amount of available bandwidth that endpoints need to have, especially in the TCP/IP stack. For example, in recent times endpoints have evolved from needing less than 10 Mbps, to 100 Mbps, to 1 Gbps, and on some endpoint platforms available bandwidth has moved up to 10 Gbps the trend is likely to continue. Such bandwidth growth has led to rapidly increasing burdens on the central processing unit (CPU). Present estimates are that processing communications may involve as much as 70% of total CPU load for TCP/IP at 1 Gbps.

The increase in CPU burden in turn has contributed to the rapid proliferation of dual-processor server machines, which have been developed both to provide enough processor cycles to service application requirements and to provide sufficient cycles for stack-related processing. Although these servers are powerful, they can be complicated to manage because they implement so many computing functions in a single platform. Administrators would benefit from a way to separately manage I/O-networking aspects of high-power servers.

While the problems specifically created by TCP/IP stack processing requirements are noted above, similar problems exist for software stacks that manage other types of interfaces, including peripheral stacks for Fibre Channel, Infiniband, Firewire (IEEE 1394), USB, Bluetooth, wireless 802.11, and other interfaces. The amount of bandwidth utilization for each of these interfaces is increasing. Further, security requirements for inspecting traffic flows and protection over such interfaces are becoming especially significant especially for traffic that bridges from one interface to another.

Past approaches have addressed some of the foregoing problems, either in an incomplete manner or with significant disadvantages. For example, in one approach the growth in bandwidth is accommodated using off-load processors. Off-load processors are special-purpose processors that assume the load that was burdening the main CPU. As an example, off-load processors can be used in TCP offload cards that offload TCP stack processing functions from a set of CPUs for a given interface. Fibre Channel host bus adapter (HBA) cards can offload storage functionality.

However, off-load processors are purpose-specific non-commodity parts, and have had very slow market penetration because of their relatively high cost. Off-load processors are not shared between multiple guest operating systems in a virtualized environment. Off-load processors are not managed from the network.

Simpler stacks such as those implementing Firewire and USB have appeared on custom chips at relatively low cost because these interfaces have become ubiquitously present in endpoint devices. However, the growth in speed of such chips has been relatively slow, the chips function more or less independently of one another, and when the chips are coupled in a device that uses both types of interfaces, performance noticeably degrades.

Offload capability for file system functions is not presently available, and requires both network offload and block storage offload to work, which cannot be achieved in a single-purpose network, TCP, or HBA card.

Programmable network interface cards such as the Alteon Tigon are known. Such programmable NICs typically have a fixed modest amount of shared memory and a small number of dedicated RISC processors performing DMA operations on the buffers. The firmware was designed to be replaceable, and may be regarded as programmable to a limited extent. These too, like offload cards, are relatively high cost and have not been widely adopted.

Recent trends in CPU chip design provide multiple CPU cores on the same die. The cores may share a common communications bus and main memory, but typically have separate caches. The use of shared memory allocation techniques that can draw memory from a large shared pool has been used in some data processing approaches but is not known for offload applications. Some approaches have used buffer pools at configuration time. Both multi-core CPUs and shared memory allocation techniques are now used on high-performance servers.

An issue associated with high-power servers is that the large amount of CPU power they provide may, in some cases, be under-utilized. Therefore, server users have begun deploying virtualization software that permits running multiple operating system instances on a single server. Virtualization software is commercially provided in Jaluna's OSware for Linux, VMWare, Microsoft's Virtual Server for multiple operating systems, IBM Hypervisor, and Xen. Xen is an open-source virtualization engine that currently includes support for some variants of Microsoft Windows, Linux, Net-BSD, and FreeBSD. Virtualization software supports limited storage virtualization and can provide some networking functions such as virtual bridging. However, the use of virtualization does not reduce the complexity of managing a high-performance server in which the guest operating systems all independently implement complex I/O-networking functions. Nor does it escape performance and security concerns, which are being addressed directly with hardware support for virtualization including Intel's VT, Vanderpol, AMD's Pacifica, (VT), AMD's Pacifica and IBM's Hypervisor technologies.

Nevertheless, some network administrators are deploying general-purpose servers, with virtual bridging enabled, as edge network devices. When such servers are integrated into a packet-switched network that also includes traditional routers and switches, managing the servers and their bridging functions becomes challenging because such management typically requires using different management tools for the routers and switches as compared to the servers.

A further problem in the field involves operating system proliferation. Developers of networking client applications face a lack of control of the varying interfaces on some proprietary platforms that inhibits access to the full suite of features necessary to port clients. Further, developers face a large number of operating systems, each of which requires a different client, often with features that are not simple to port from one to another. This problem exists with Microsoft Windows, Linux, Solaris, AIX, HPUX, Mac OSX, Symbian, PalmOS, and other operating systems. In addition, some versions of applications or security policies may be specific to a particular version or patch level of an operating system. Current virtualized systems reimage the operating systems along with the network stacks, requiring subsequent configurations of the network interfaces every time a new and sometimes even a modified OS is needed.

Intel's ETA technology offloads network functions to a processor, but does not allow sharing the stack across hosts. Related literature in the field includes: A. Currid, "TCP Offload to the Rescue," ACM Queue, http://acmqueue.com/modules.php?name=Content& pa=showpage&pid=154; Microsoft Corporation, "Microsoft Scaleable Networking Initiative," http://www.microsoft.com/whdc/device/network/scale.mspx; and others.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram providing a detailed view of functional elements providing networking services in the stack arrangement of FIG. 1B.

FIG. 2A is a block diagram showing another embodiment of an offload I/O-networking stack.

FIG. 2C is a block diagram of the embodiment of FIG. 2B showing further details of an example software architecture, focusing on software elements used to perform network communication via Ethernet.

FIG. 2D is a block diagram showing an embodiment of an I/O-networking stack for block, file system and network offloading.

DETAILED DESCRIPTION

Figure 1A:
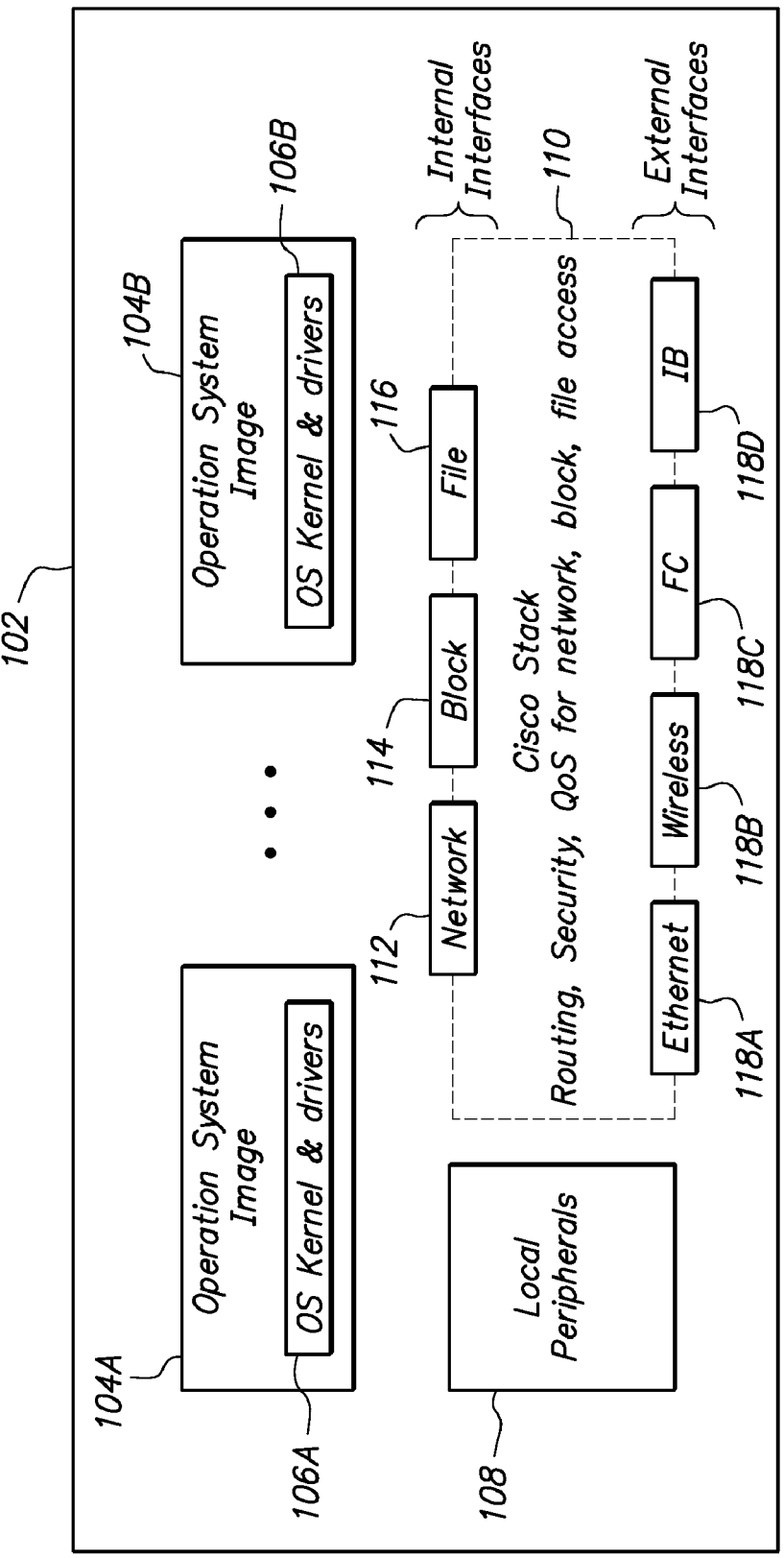
FIG. 1A is a block diagram of an example network endpoint showing software architecture for an example embodiment.

Methods and apparatus providing network stack offloading approaches are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A. General Overview

The approaches proposed here take into account all of the needs identified in the background to provide a solution that meets security, performance, and management requirements, while maintaining compatibility with standard processors. In one respect, opportunities provided by virtualization, real time monitor operating systems, and multi-core CPU chipsets are combined and improved to produce a flexible open platform for I/O control and protection along with a common management interface as a beneficial side effect.

1. Specialization of CPU Cores for Networking

In one embodiment, one or more processors of an endpoint device may be dedicated as a network core to route all I/O interfaces. The endpoint device may be a server, workstation, mobile client or other endpoint device, and embodiments are not limited to any particular endpoint device. For example, an endpoint device may be a server running VMWare and hosting a virtual bridge and serving as a network edge device in an enterprise network. The processor may be a physical CPU. In an alternative embodiment, which is appropriate for managing a single lower-bandwidth interface and when software protection is sufficient to isolate one virtual processor from another, the processor may be a virtualized processor, effectively a logical fraction of a physical core.

In another alternative embodiment, the processor may be one or more of the cores in a multi-core CPU. An advantage of a multi-core CPU is that physical elements isolate one core from another core. The discussion below assumes that a network stack is hosted on one or more cores of a multi-core processor. The core that hosts the network stack is termed "I/O-networking core."

In one embodiment, the I/O-networking processor core runs an operating system dedicated and optimized to perform platform I/O requirements for all the other operating systems and their applications running on other processor cores. The I/O-networking processor core may feed data to other processor cores or CPUs that have access to shared memory. The I/O-networking core can be programmed to adapt to new or evolving protocols, while benefiting from improvements in processor performance that may occur according to the more rapid improvements in commodity CPU design observed under Moore's Law. The I/O-networking core may run a specialized I/O-networking stack as an operating system. The I/O-networking stack performs all I/O-networking functions for all other cores or processors in a host server, so that such functions are offloaded from the other cores or processors to the I/O-networking core and stack. In an embodiment, the I/O-networking stack performs all networking, security, VPN functions, and all bridging and routing among processors or cores in the host. Guest operating systems running on other cores or processors under virtualization appear to have hardware for performing all such functions, which in fact are handled by the I/O-networking core and stack. The supplementary services, and even select I/O-related services, may be run in their own sandboxed virtual machines to assure resiliency (service failures are isolated from impact on other running services and can even run in distinct types of operating systems and under different licensing regimes).

In one embodiment, the I/O-networking core has access to the physical layers of all system interfaces, such as Ethernet or Fibre Channel, and can manage other stack elements that implement other interfaces, even as such interfaces evolve or are enhanced.

In one embodiment, the I/O-networking core facilitates direct memory access techniques over the network, such as RDMA over Infiniband or TCP/IP, based on pointers to the buffer area used by the interfaces. In an embodiment in which processor cores share main memory, data copy operations directed through the kernel from the NIC can preclude the need to use kernel copy operations, and can be shared as intersection memory across operating systems with a flexible buffer space that is shared by the resident operating systems. Thus, an embodiment may implement a form of zero-copy technique across operating systems.

In one embodiment, the I/O-networking core may be coupled to one or more hardware acceleration units for addressing one or more computationally intensive tasks. For example, a hardware acceleration unit coupled to the I/O-networking core may perform block encryption or other repetitive, computationally intensive tasks.

2. I/O-Networking Core OS

In one embodiment, the I/O-networking stack software that runs on the I/O-networking processor core is implemented based on network stack software from one of the BSD operating system variants, such as FreeBSD or NetBSD. The network stack implementations in these operating systems have high quality and a high degree of security against attack. The BSD network stack implementations also allow insertion of shims and bypasses for endpoint client applications such as antivirus, virtual private networking (VPN), discovery protocols (such as Cisco Discovery Protocol CDP), network admission control (such as Cisco's NAC), Cisco Security Agent (CSA) Cisco Trusted Security (CTS), wireless client utilities, and future developments including those from Cisco Systems, Inc., San Jose, Calif.

A benefit of using FreeBSD or NetBSD is that under the present software licensing arrangements applicable to those systems, developers can write kernel drivers without having to release source code, which is a requirement for the use of Linux and other OS software to which the GNU General Public License (GPL) applies. Other operating systems, including proprietary licensed systems, or those licensed under the GPL such as Linux, may also be used.

In other embodiments, other network stack software may form a foundation for an I/O-networking stack having the functions and architecture described herein.

3. Virtualization

In one embodiment, the I/O-networking processor core is hosted on one or more virtual processors of a CPU that supports processor virtualization.

Even with dedicated resources in the I/O-networking core, a need remains for real-time coordination between the I/O-networking core and other operating systems that are running on the same hardware platform. One embodiment provides a hypervisor that runs below the operating systems that can manage memory for sharing data across operating systems, and validate the insertion of software shims into the I/O-networking core, yet still insulate it from the other operating systems that are running on other cores or virtualizations of the CPU.

In one embodiment, CPU virtualization engines are extended to individual processor cores. Example CPU virtualization engines may be based on or use VMWare, IBM Hypervisor, Xen, Microsoft Virtual Server or Jaluna's OSware. In various embodiments, the I/O-networking processor core may be hosted on one of a plurality of processor cores, or virtual machines are used to split a CPU into one or more virtual environments. In one embodiment, the OS kernel is modified to support virtualization. In another embodiment, all instructions are sandboxed in a virtual machine. The virtual machines may be established and managed by a virtual machine monitor (VMM).

In one embodiment, a real time operating system (RTOS) serves as a system monitor to control the number, type and traffic between multiple simultaneously available operating systems. Further, the I/O-networking software of the I/O-networking core runs on the RTOS. The RTOS runs logically below the operating systems on the CPU, or on a special off-CPU processor. An example of a suitable RTOS is Jaluna's Chorus real time kernel.

In this approach, the RTOS can sense system state across operating systems that are running applications on other cores, including physical cores or virtual cores, and can optimally allocate necessary resources from the large local memory pool necessary to support the networking functions required by the combination of interface types, protocols, applications and reliability of network connections. The RTOS can register problems with these operating systems before they boot, or if they refuse to boot. The RTOS can sense security vulnerabilities based on an archaic version of software and firmware that need to be updated before the system can return to secure running modes. In short, the RTOS gives the design an additional layer of security protection and control not usually available to a non-secure OS design.

In an embodiment, the RTOS can manage shared or "intersection" memory to discriminate but allow appropriate data sharing between multiple operating systems. In combination with an OS virtualization approach, either physical OS virtualization or logical OS virtualization, the RTOS can isolate the operating systems from one another except for access to the shared memory area.

In contrast, conventional virtualization systems manage memory by totally locking out one operating system instance from another to avoid interference. Examples of the conventional virtualization approach include IBM LPAR and Hypervisor. Unlike such approaches, in an embodiment, a common memory is provided to which one operating system, as opposed to multiple processes or multiple applications, can write while another operating system reads, or the converse. The RTOS acting as system monitor can configure the shared intersection memory area and also can selectively control access to minimize buffer sizes, including avoiding overflows, and dynamically resize buffers to suit interface stack requirements and traffic properties.

Buffering the intersection memory can eliminate the multiple memory copy operations for transferring data between an application, kernel, and network. For example, a TCP stack and an Infiniband stack can be configured as part of the network I/O processor, with a shared memory area large enough to perform packet reordering for jumbo frames in the TCP stack. Conversion or gateway software may perform translating frames back and forth to or from the Infiniband protocol using the single shared memory area that holds the data for applications to read or write into.

In one embodiment, as part of system monitoring, the RTOS also can protect against illicit bridging of data across interfaces. An example of such improper bridging is the transport of protected CTS (Cisco Trusted Security link layer encrypted) traffic on a wired link across an unprotected wireless link to an eavesdropper. The RTOS monitor can also provide ancillary benefits, such as inhibiting the ability of one OS to illicitly modify another. For example, the RTOS monitor can look across operating systems to prohibit using Linux to edit the Microsoft Windows registry. This is an extension of what Cisco's CSA can do to monitor behavior within a single operating system across multiple virtualized systems.

4. Unified Client

An embodiment in which a single OS manages all I/O interfaces also allows preparing other software, for the management of such interfaces and the security solutions that depend upon them, just once and provides simplified provisioning and maintenance. The use of a single OS for the I/O component, plus an RTOS monitor, allows developers to innovate more rapidly and openly on a common platform, eliminating the problem of operating system proliferation.

A further benefit of using a single OS for monitoring and management of the I/O stack and its network services is that a graphical user interface (GUI) for administration and other functions can be prepared for the single shared OS. Therefore, a unified extensible client interface is practical for the first time.

In one embodiment, a security service used with the I/O-networking core instantiates the minimum presence required to assure that the network can trust the information on the host, and bilaterally enables the applications to trust the network through its local presence on the host. Consequently, a composite identity exists on the host, consisting of application software and supporting operating systems in combination with the I/O-networking operating system. Both identity components may be anchored in secure hardware. These include the Trusted Computing Group's (TCG) Trusted Platform Module (TPM) and its virtualized form (VTPM) inside which the signatures of the software components (ranging from OS through application components) down through the VMM, RTOS, I/O plus its related modules, and the cryptographic processing for their verification and authoritative attestation can be accomplished. Security for the I/O-networking core is achieved in part from isolation of the I/O-networking core from applications, in part from the use of monitoring by a centralized RTOS that has fewer security vulnerabilities, and in part from its open implementation.

Network management services are provided, in an embodiment. Because the network is more clearly bound on the host, the network can be provisioned and maintained by a network administrator without interfering with server managers. The network administrator manages only the I/O-networking core OS, and not the applications or the guest operating systems that host the applications. In an embodiment, the I/O-networking core and I/O-networking stack are managed with the same management tools that are used to manage conventional routers and switches in the same network.

5. Benefits of Various Embodiments

Guest operating systems and their management may be greatly simplified as all I/O-networking functions across multiple guest operating systems can be are handled by a single separate I/O-networking stack that is independently managed. For example, a guest operating system may have a single device driver for storage, a single device driver for networking, and a single device driver for accessing files. Such device drivers interface to the I/O-networking stack, which handles transformation of guest OS requests to particular services, protocols, and hardware devices.

In an embodiment, behavior and requirements of applications relating to the network are better defined because well-defined boundaries are afforded by the operating system virtualization approach. Traffic flows can be monitored in or signaled to the I/O networking core, buffers can be adjusted and the changes signaled to applications by the RTOS. Applications can reach into the intersection memory area as needed based upon policy-based control granted by the monitor.

Embodiments facilitate increased traffic volume because gigabit Ethernet interfaces can function as if they are using custom hardware acceleration units. The increased traffic volume is likely to increase the need for higher-performance switches and routers, starting with servers in data centers. These machines will be more secure, and therefore less expensive to maintain. Servers running multiple operating systems on demand will be simpler to provision for on-demand purposes, since the I/O-networking core and stack can remain static while the applications and operating systems move from machine to machine and platform to platform over the network, thereby more judiciously moving traffic, and optimizing resource use.

Networking products that run on an endpoint benefit because they are no longer tied to multiple operating systems, especially closed-source implementations such as Microsoft Windows and AIX that inhibit external innovation.

A single operating system that can support many client functions, including a common management user interface, is beneficial. For example, while a GUI for the single OS could be implemented in a high-level language such as Java®, low-level management and shim integration functions are best implemented using the same language as used to implement the OS. Since there is one OS, such implementation is simplified.

B. Example I/O-Networking Core Implementations

1. A Combined Offload Stack for Network, Block and File I/O

An I/O-networking stack is provided that, in one embodiment, runs on a separate logical processor core of a multi-core endpoint computer system such as a multi-processor server. The I/O-networking stack controls all network and block storage interfaces of the endpoint, and can be shared between multiple guest operating systems that run on other cores of the endpoint. The I/O-networking stack includes software elements for performing all network processing that is necessary or appropriate, such as RDMA and IPSec. Applications access networking functions through socket and/or packet interfaces, and therefore TCP applications and UDP applications and packet-level applications can interoperate with the I/O-networking stack.

The I/O-networking stack also provides block storage and file system functions, and therefore offloads these computation-intensive functions from each processor that is executing an operating system or applications. The file system functions are coupled to a virtual file system of the endpoint. The block storage functions of the I/O-networking stack are coupled to a block interface driver of the endpoint. For example, the block interface driver may provide a SCSI block and object interface to the I/O-networking stack. In such an embodiment, SCSI devices may be attached using any appropriate storage interface, such as Fibre Channel, SCSI bus, or iSCSI.

The I/O-networking stack can function as an intermediate embedded network device that can perform bridging, switching or even routing between hosts on a server or hosts located outside a server on which the I/O-networking stack runs. The I/O-networking stack can offload all I/O operations from a processor core and can share any number of processors, processor core, and operating system images, including different operating system types.

FIG. 1A is a block diagram of an example network endpoint showing software architecture for an example embodiment. Endpoint 102 is a general-purpose data processing system that has one or more processors each having one or more processor cores. For purposes of illustrating a clear example, endpoint 102 may be considered to have two processor cores. One or more operating system images 104A, 104B run on a first processor core. Each OS image 104A, 104B includes a respective OS kernel and driver software 106A, 106B. Operating system images 104A, 104B may relate to completely different operating systems. For example, operating system image 104A may be Microsoft Windows and image 104B may be IBM AIX.

Endpoint 102 may include one or more local peripherals 108 such as interfaces for a keyboard, pointing device, monitor, sound, etc.

In one embodiment, a second processor core hosts or contains an I/O-networking stack 110. Generally, the I/O-networking stack 110 implements all input, output, and networking functions that a conventional endpoint operating system would provide, such as packet routing, security protocols, and quality of service operations or protocols for network, block, and file access. Examples of functions provided in I/O-networking stack 110 include TCP/IP networking, networking under other protocols such as AppleTalk, peripheral communications through USB and conventional serial interfaces, block data transfers to SCSI devices, file reading from and writing to mass storage devices, etc.

I/O-networking stack 110 may be implemented as one or more software elements that are hosted by an operating system on one or more cores or CPUs. Alternatively, I/O-networking stack 110 may be implemented as a dedicated hardware element, such as a special-purpose CPU core that provides all functions described herein. In addition some network interface cards (NICs) may include a subset of hardware or software acceleration technologies and the I/O-networking stack may then implement the remainder, optimally leveraging capabilities across components.

The I/O-networking stack 110 comprises a plurality of internal interfaces including, for example, a network interface 112, block storage interface 114, and file system interface 116. The internal interfaces provide a means of communicating data and control information between operating system images 104A, 104B and the I/O-networking stack 110. For example, instead of internally implementing TCP/IP, operating system image 104A can call the network interface 112 of I/O-networking stack 110 whenever a TCP/IP function is needed. Similarly, operating system 104A can make use of storage devices and file access services provided by the I/O networking stack using interfaces 114 and 116, respectively.

Drivers in OS kernel and driver software 106A, 106B may include a simplified set of device drivers that interface to the network interface 112, block storage interface 114, and file system interface 116. Further, OS 104A, 104B may have a single device driver among driver software 106A, 106B for storage, a single device driver for networking, and a single device driver for accessing files. Such device drivers interface to the I/O-networking stack 110, which handles transformation of guest OS requests to particular services, protocols, and hardware devices and communication through external interfaces. As further discussed below, a guest OS may establish communication to files, storage and network devices using sockets.

Therefore, OS 104A, 104B are greatly simplified as all I/O-networking functions are handled by a separate I/O-networking stack that is independently managed. An OS 104A, 104B need not have a separate device driver for every type of network device that the OS may need to communicate with or for every version of the OS. Each OS 104A, 104B need not maintain security codes associated with devices or interfaces. This approach promotes stability for OS 104A, 104B and improves security of OS 104A, 104B. All I/O networking functions are offloaded from each of OS 104A, 104B to the I/O-networking stack 110, and the I/O-networking functions of the stack are effectively amortized across multiple operating systems. According to an embodiment, some I/O networking functions may not be offloaded; for example, some I/O networking functions may be required to remain coupled to its respective OS, or there may be some I/O networking functions that have been implemented in high performance hardware.

The I/O-networking stack 110 further comprises a plurality of external interfaces 118A, 118B, 118C, 118D, such as Ethernet interface 118A, wireless interface 118B, Fibre Channel interface 118C, and Infiniband interface 118D. The external interfaces are communicatively coupled to other networks or network devices. The I/O-networking stack 110 is responsible for transforming all calls from the operating system images 104A, 104B that request networking services and require external communications to appropriate packet transmission or reception on the external interfaces.

Figure 1B:
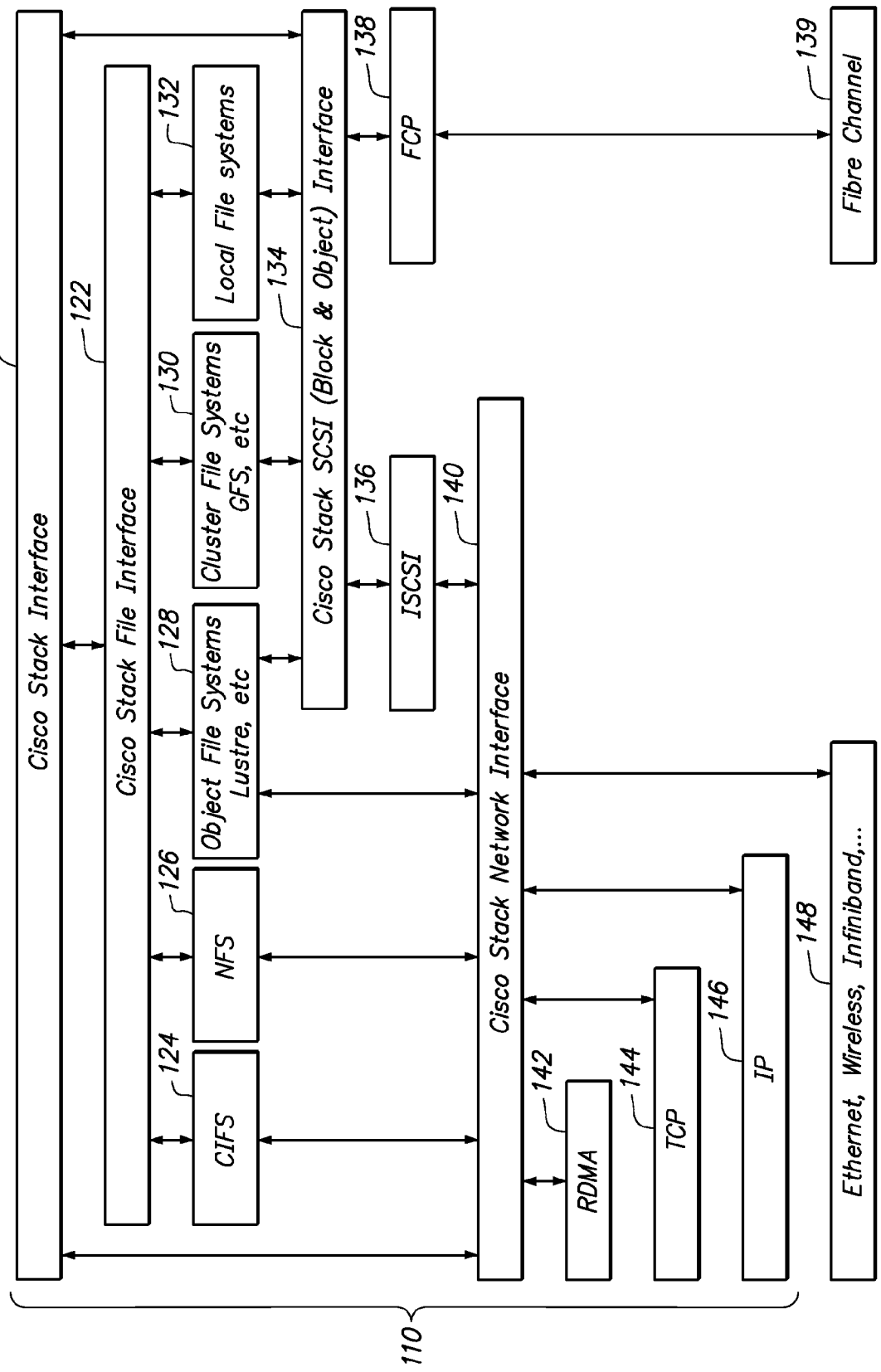
FIG. 1B is a block diagram of an example implementation of an I/O-networking stack.

FIG. 1B is a block diagram of an example implementation of an I/O-networking stack. For example, I/O-networking stack 110 may comprise elements shown in FIG. 1B.

A stack interface 120 is logically situated at a highest layer of I/O-networking stack 110 and interfaces processor and processor core hardware elements to other parts of the I/O-networking stack. Operating system drivers that need to obtain I/O-networking services use the stack interface 120 to obtain such services. Principal functional layers of I/O-networking stack 110 include a stack file interface 122, stack network interface 140, and stack storage interface 134, each of which is now described.

The stack network interface 140 couples stack interface 120 to lower-level networking functional elements such as an RDMA module 142, TCP module 144, IP module 146, and one or more physical protocol modules 148. RDMA module 142, TCP module 144, IP module 146, and the physical protocol modules 148 comprise software elements that implement the protocols specified by their names. For example, TCP module 144 can perform TCP three-way handshaking and maintain and manage TCP connections.

The stack file interface 122 mediates calls to functional elements that provide file manipulation functions. Stack file interface 122 provides file-level access to external resources. Stack file interface 122 determines what resource has been requested and what form of access method is required, and passes requests to the correct functional module. Some file manipulation functions require network services that are obtained through stack network interface 140, and some file functions use storage services that are obtained through stack storage interface 134.

For example, stack file interface 122 is coupled to CIFS module 124 and NFS module 126, which provides network file system (NFS) protocol services. Stack file interface 122 also may be coupled to one or more object file system modules 128 that provide object-based file services as defined by Lustre and other vendors.

Stack file interface 122 also may be coupled to one or more cluster file system modules 130 and to a local file system module 132. One of the cluster file system modules 130 may provide GFS functions, for example.

Object file systems modules 128, cluster file system modules 130, and local file system module 132 may be coupled to stack storage interface 134, which mediates calls to external storage systems that use data transfer operations that conform to SCSI or similar block data transfer protocols. The stack storage interface 134 determines what type of storage request has been made and interfaces the request to the correct functional module. For example, stack storage interface 134 may forward storage requests that address iSCSI devices to iSCSI module 136, which passes network requests to stack network interface 140. Further, stack storage interface 134 may forward requests to access Fibre Channel devices to FCP module 138, which is coupled to one or more Fibre Channel interfaces 139.

In an embodiment, stack storage interface 134 may comprise a plurality of interfaces including, for example, an object interface and a separate block interface. Further, CIFS module 124 may interface to a WAFS client module that also forms a part of I/O-networking stack 110.

In another embodiment, stack storage interface 134 is coupled to a BIOS interface that enables a processor to obtain disk access for purposes of performing bootstrap loading. In still another embodiment, I/O-networking stack 110 comprises non-volatile memory that is accessible by the I/O networking core and by a configuration tool. The non-volatile memory may hold boot parameters, security parameters such as IPSec or CTS setup values.

In this configuration, the I/O-networking stack provides a complete set of file, storage, and networking services and can effectively offload processing requirements for such services from an operating system.

FIG. 1C is a block diagram providing a detailed view of functional elements providing networking services in the stack arrangement of FIG. 1B. In particular, FIG. 1C indicates that stack network interface 140 may provide access to any of a plurality of networking services that are provided by corresponding functional modules. Examples of functional modules include: internal IP forwarding module 150; IPSec/CTS module 152; VLAN support module 154; QoS module 156, which is responsible for traffic control, shaping and policing; and internal switching module 158.

Additionally or alternatively, stack network interface 140 may provide access to functional modules that perform SSL processing, firewall functions, connections to anti-virus scanners, discovery protocols such as CDP, control protocols such as ICMP, and management protocols.

2. Sharing a Single Offload Stack Between Multiple Operating Systems

According to an embodiment, an I/O-networking stack as previously described runs in an offload virtual machine/domain that has been created by a virtual machine monitor. Accordingly, the size of domains that host guest operating systems is reduced, because an I/O-networking stack resides only in the offload domain and not in the other domains. Further, the offload domain hosts an operating system that is highly customized for I/O-networking features and functions. Network quality of service (QoS) processing is handled uniformly even when disparate operating systems are running in the other domains.

Running the I/O-networking stack as a guest operating system, rather than as a software element that requires a dedicated processor core, allows the I/O-networking stack to be hosted on only a portion of a core, an entire core, or a plurality of cores. The allocation of resources can be dynamically arbitrated by the management subsystem working in conjunction with the VMM to take into account signaling from the external core network about incoming traffic properties, or from local applications regarding outgoing traffic properties. These are used to optimize how much memory, how many cores or logical processors, and other local resources are devoted to networking versus computation. Accordingly, a plurality of other guest operating systems running on other cores, CPUs, or virtualized domains can share networking, block, and file services provided by the I/O-networking stack. Thus, multiple OSs can offload networking, block and file services to one separately hosted I/O-networking stack.

FIG. 2A is a block diagram showing another embodiment of an offload I/O-networking stack. In FIG. 2A, guest operating systems 204A, 204B run in two separate domains established by virtual machine monitor 206, and I/O-networking stack 110 runs in a third domain. In this configuration, I/O-networking stack 110 runs on top of an operating system under the VMM 206.

Each of the domains, and therefore each guest OS 204A, 204B, may run on the same processor as the I/O-networking stack 110. Alternatively, the guest operating systems and I/O-networking stack 110 may run on virtual domains on one processor core. Domains hosting the guest operating systems 204A, 204B and I/O-networking stack 110 also may extend across multiple processors. Thus, the I/O-networking stack 110 may run on a CPU core, on a plurality of cores of a CPU including all cores of the CPU, or utilize multiple CPUs. Further, the I/O-networking stack may run within a hyper thread on a CPU.

The I/O-networking stack 110 has the structures and functions described above with respect to FIG. 1A.

Figure 2B:
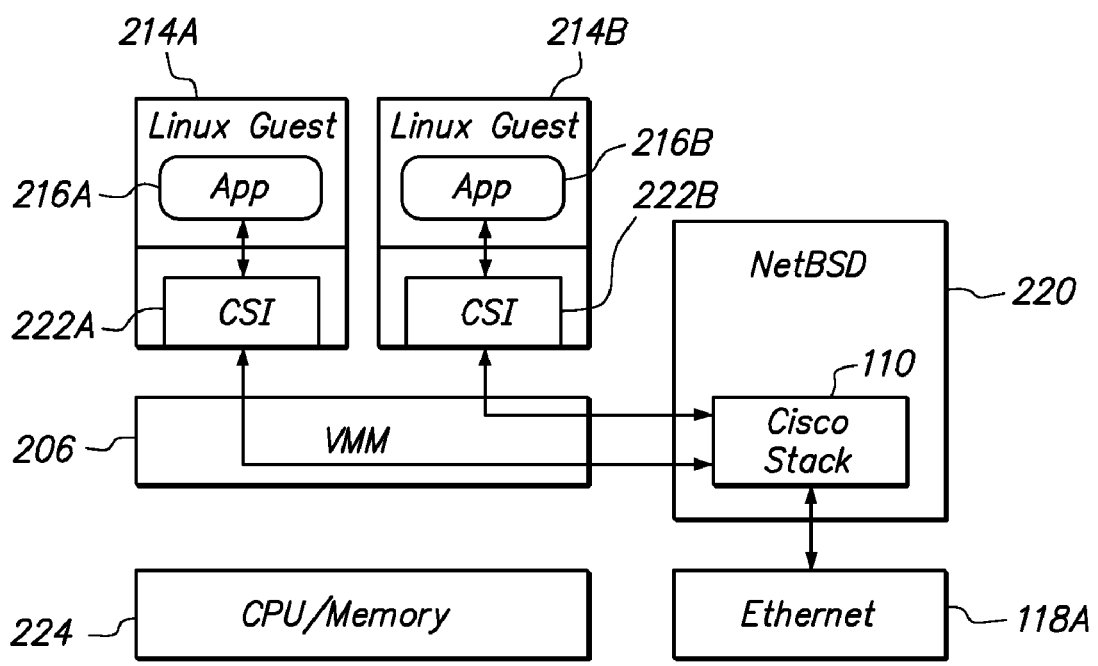
FIG. 2B is a block diagram showing interface elements that may be used in the embodiment of FIG. 2A.

FIG. 2B is a block diagram showing interface elements that may be used in the embodiment of FIG. 2A. In the embodiment of FIG. 2B, one or more processor cores host Linux guest operating systems 214A, 214B, each of which hosts a respective Linux application 216A, 216B. Linux is merely one example of an operating system that may be hosted on the one or more processor cores, and the applications 216A, 216B may be of any variant capable of being executed by the operating systems. Application 216A, 216B may be completely unrelated and perform different functions or provide different services.

A NetBSD operating system 220 hosts the I/O-networking stack 110. All the foregoing elements are hosted on a CPU 224 having associated memory. NetBSD is merely one example of an operating system 220 that can host the I/O-networking stack 110. However, an advantage offered by the present architecture is that operating system 220 may be simplified with fewer functions than a typical general-purpose OS and therefore may be structured with greater security. Further, in an alternative embodiment, the functionality provided by operating system 220 and I/O-networking stack 110 may be implemented in optimized hardware such as in a special-purpose CPU core.

The Linux guest operating systems 214A, 214B each host a stack interface (CSI) 222A, 222B, which provide a secure interface to I/O-networking stack 110. Applications 216A, 216B obtain network functions from the I/O-networking stack 110 by establishing socket interfaces to the I/O-networking stack 110. According to an embodiment, applications 216A, 216B access block and file functions by an extension of the block driver and VNODE/VFS layer. According to an embodiment, access of the layer 2 networking capabilities may also be utilized by a simple packet interface rather than the socket interface.

In certain embodiments, functional elements of operating system 220 can supplement the functions of I/O-networking stack 110. For example, in one embodiment in which OS 220 is NetBSD, I/O-networking stack 110 communicates to one or more network interfaces, such as Ethernet interface 118A, using the NetBSD TCP stack rather than a TCP functional module contained within the I/O-networking stack.

FIG. 2C is a block diagram of the embodiment of FIG. 2B showing further details of an example software architecture, focusing on software elements used to perform network communication via Ethernet.

A guest operating system such as guest OS 204B hosts one or more user applications 216B. The guest OS 204B obtains I/O-networking services by making socket calls 230 to I/O-networking stack 110 through stack interface front-end 222B. A ring buffer interface 232 is interposed between guest OS 204A, 204B and I/O-networking stack 110. The ring buffer interface 232 enables I/O-networking stack 110 to mediate concurrent calls from guest OS 204A, 204B that seek to use the same resource in the same way at the same time, and therefore are mutually exclusive calls.

Calls mediated through the ring buffer interface 232 arrive at stack interface back end 234. In an embodiment in which the NetBSD operating system hosts the I/O-networking stack 110, socket calls 230 terminate at NetBSD kernel sockets 236. For socket calls that request TCP/IP networking services, the socket calls are serviced by NetBSD TCP/IP adapter 238. For TCP/IP communications over Ethernet, a NetBSD E1000 driver 240 drives Ethernet interface 118A. The E1000 driver 240 is merely an example that is appropriate for certain Intel Ethernet chipsets; in other embodiments that use other chipsets, different drivers may be used.

FIG. 2D is a block diagram showing an embodiment of an I/O-networking stack for block, file system and network offloading. A guest operating system such as guest OS 204A, 204B hosts one or more user applications 216A, 216B. Each guest OS 204A, 204B has a block driver interface 260A, 260B, a VFS interface 262A, 262B and a socket call interface 264A, 264B. Each guest OS has a stack interface front-end 222A, 222B.

In one embodiment, the guest operating systems 204A, 204B share a ring buffer interface 232 and a stack interface back end 234. The ring buffer interface 232 and stack interface back end 234 are also shared by the I/O-networking stack 110, which performs block stack offload 270, file system stack offload 272 and network stack offload 274.

Block stack calls mediated through the ring buffer interface 232 arrive at stack interface back end 234. The block storage functions of the I/O-networking stack are coupled to a block interface driver of the endpoint. For example, the block interface driver may provide a SCSI block and object interface to the I/O-networking stack such as iSCSI adapter 276 and NetBSD SCSI adapter 278. The iSCSI adapter 276 then utilizes the NetBSD TCP/IP adapter 280 to communicate with remote iSCSI storage devices. The I/O-networking core may also facilitate direct memory access techniques over the network, such as by using RDMA over the NetBSD TCP/IP adapter 280.

File system stack calls mediated through the ring buffer interface 232 arrive at stack interface back end 234. The stack file interface 272 is coupled to CIFS module 284A and NFS module 284B, which provides network file system (NFS) protocol services. Stack file interface 272 also may be coupled to one or more distributed file system modules 284C and to a local file system module 284D. Data may be sent through the NetBSD TCP/IP adapter 280 or via SCSI using Fibre Channel or another local interface. The NetBSD TCP/IP adapter may utilize the iSCSI protocol 276. A NetBSD SCSI adapter 278 may be provided.

Network stack calls mediated through the ring buffer interface 232 arrive at stack interface back end 234. In an embodiment in which the NetBSD operating system hosts the I/O-networking stack 110, socket calls 264A and 264B are processed by NetBSD kernel sockets 236. For socket calls that request TCP/IP networking services, the socket calls are serviced by NetBSD TCP/IP adapter 238. For TCP/IP communications over Ethernet, a NetBSD E1000 driver 240 drives Ethernet over interface 288.

Components of the stack in the host systems are connected through an interface 288 that may be comprised of an Infiniband network or a data center Ethernet (DCE) network to stack components that are resident in one or more gateway devices. Network, block and file functions use this network to create an interface for communicating data and control information between the host and gateway stacks. Infiniband and DCE are merely two examples of communications protocols that may be used for communications in the hierarchical stack architecture. Alternatively, gigabit Ethernet or Fibre Channel could be used.

Figure 4:
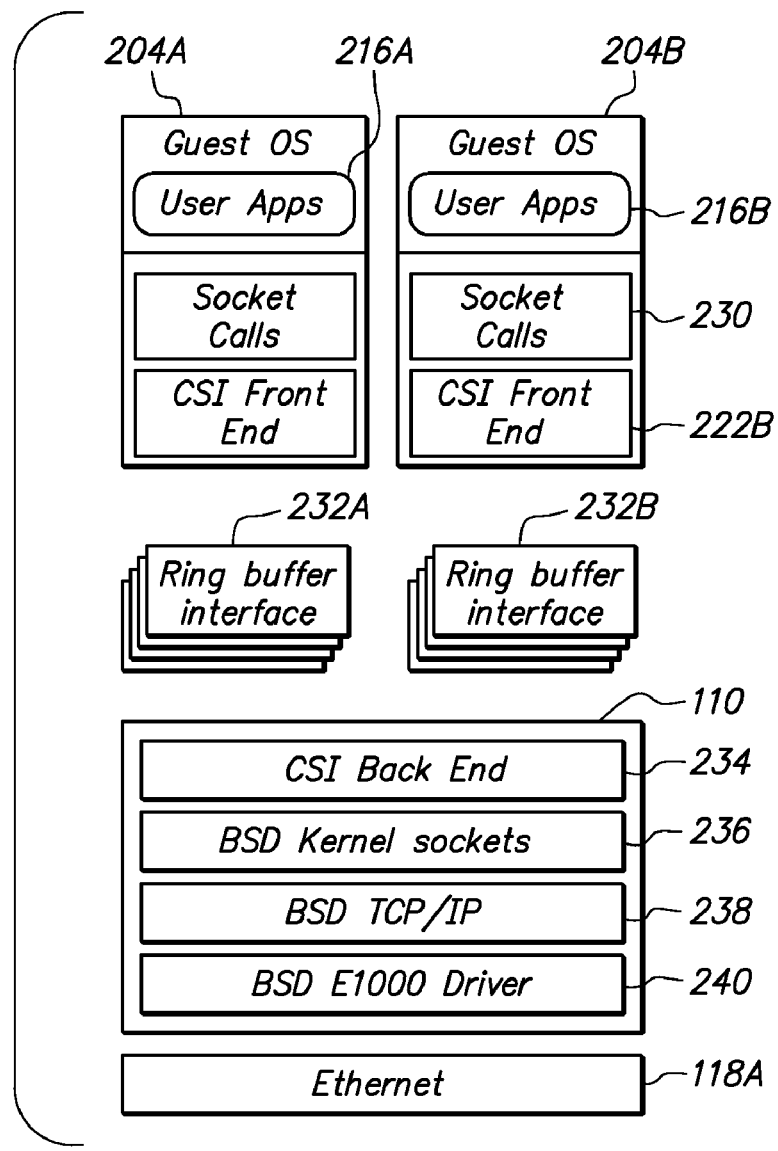
FIG. 4 is a block diagram of the system of FIG. 2C in an arrangement that uses a plurality of ring buffer interfaces.

FIG. 4 is a block diagram of the system of FIG. 2C in an arrangement that uses a plurality of ring buffer interfaces. For example, a first set of ring buffer interfaces 232A is associated with a first guest OS 204A, and a second set of ring buffer interfaces 232B is associated with a second guest OS 204B.

One embodiment provides multiple ring buffer interfaces based upon QoS levels. In this embodiment, socket calls 230 are associated with QoS values, and socket calls having a first QoS value are mediated in a first ring buffer interface in a set, such as set 232A, and calls with a second QoS value go to a second ring buffer interface. This approach provides uniform handling for the QoS levels between all guest operating systems running on the cores.

Further, in an embodiment, a given connection operates at a single QoS level. In another embodiment, a protocol may be defined to operate at a single QoS level.

In an embodiment, the highest priority ring interface is reserved and used to send all control traffic between the guest operating systems 204A, 204B and the I/O-networking stack 110 so that control traffic is not stalled behind lower-priority application data.

In another embodiment, one ring buffer interface is provided, to which multiple queues feed data. In this embodiment, each queue is associated with one QoS level.

Figure 5:
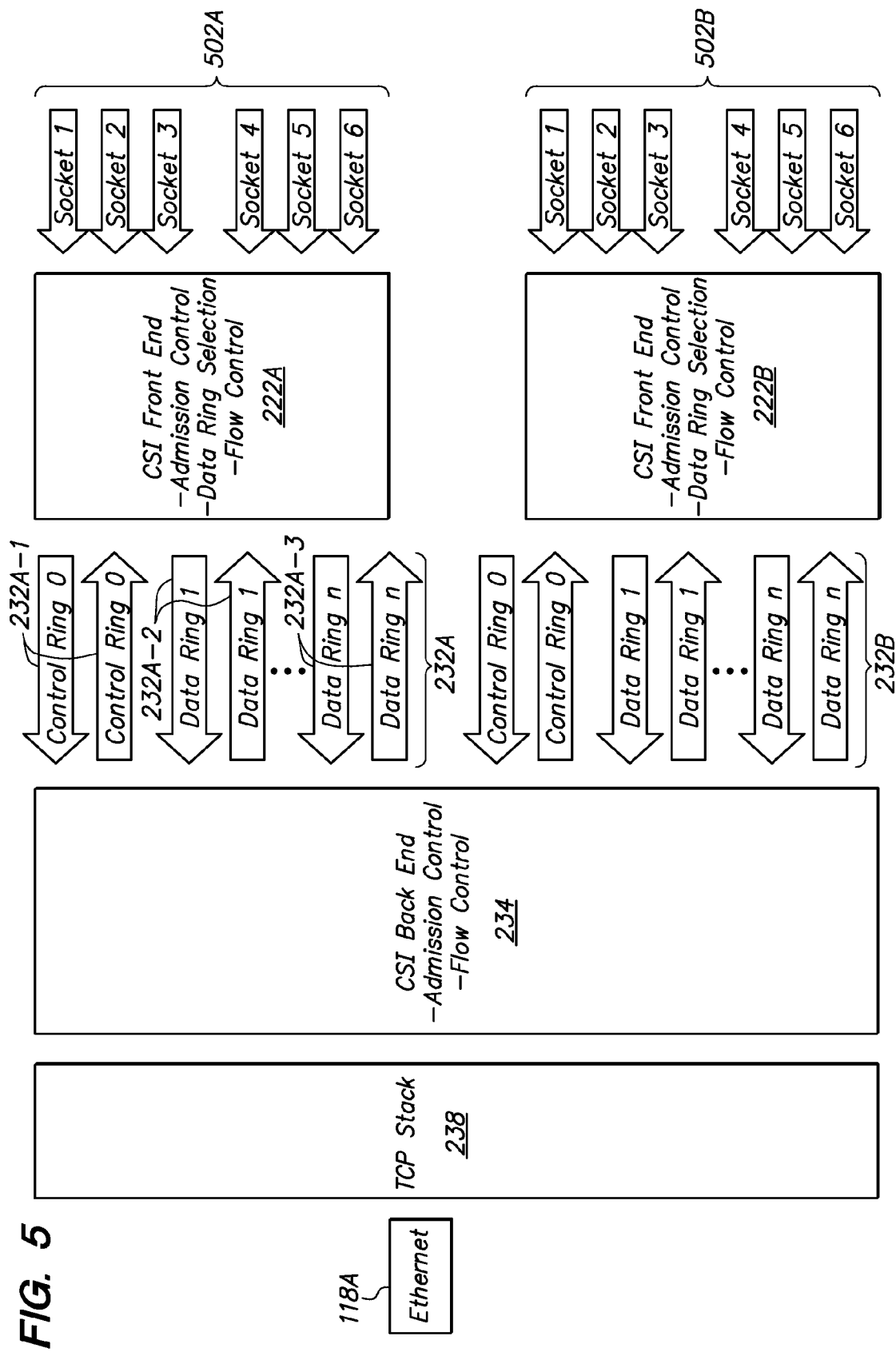
FIG. 5 is a block diagram of the system of FIG. 4 showing the flow of transmitted data in one embodiment.

FIG. 5 is a block diagram of the system of FIG. 4 showing the flow of transmitted data in one embodiment. A plurality of socket calls 502A may arrive from a first guest OS asynchronously at stack interface front-end 222A. The socket calls 502 are separated and sent to individual ring buffers 232A-1, 232A-2, 232A-3 for communication to stack interface back end 234. A first ring buffer 232A-1 is designated a control buffer and carries a highest QoS level to ensure delivery of control information. The remaining ring buffers carry data associated with transmission or receiving. Stack interface back end 234, in this embodiment, performs admission control for data arriving on the ring buffers and performs flow control for connections.

TCP connections are either individually assigned to a QoS level or a protocol is assigned to a QoS level. The network-offload service domain receives the requested QoS level from the guest OS but it can be changed based upon provisioning. Interfaces may extend beyond Ethernet based L2. Thus, Ethernet interface 118A is shown merely as an example.

The shared network stack may also incorporate virtual switch and networking functions common to switches, routers, and/or NAT devices.

Figure 3:
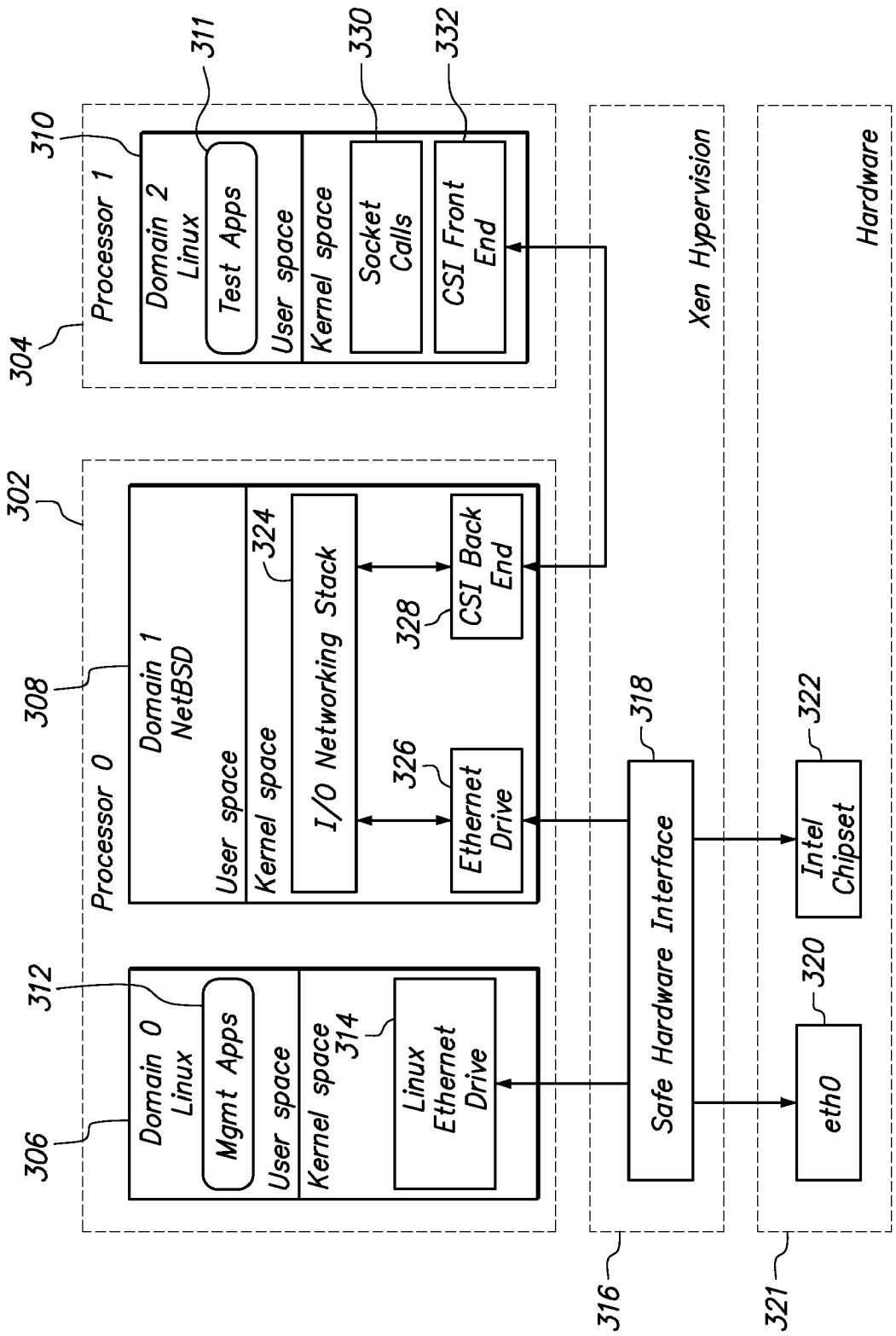
FIG. 3 is a block diagram of an example implementation using two processors and three virtual machines.

FIG. 3 is a block diagram of an example implementation using two processors and three virtual domains, domains in FIG. 3 being names given to the virtual machines executing on the processors 302, 304. A first processor 302 hosts two domains 306, 308 that respectively host the Linux operating system and NetBSD operating system. A second processor 304 hosts a second domain 310 that runs Linux. Processors 302, 304 also broadly represent a plurality of processor cores of a single processor chip.

The Linux OS in first domain 306 runs one or more management applications 312 in user space, and runs a Linux Ethernet driver 314 in kernel space. The driver 314 is coupled to an Ethernet port 320 denoted "eth0" in a hardware layer 321 through a safe hardware interface 318. The safe hardware interface 318 provides protections in the Xen Hypervisor layer 316 which prevents guest domains from accessing devices they have not been authorized to use.

The NetBSD OS in second domain 308 runs an I/O-networking stack 324 in kernel space. The I/O-networking stack 324 is coupled to an Ethernet driver 326 and to a CSI TCP back end driver 328. The Ethernet driver 326 communicates Ethernet frames to and from an Ethernet port provided by Intel chipset 322 through the interface 318. The Intel interface, in this example, is assigned to the I/O-Networking stack domain so that it can directly access the hardware without involvement from any other domain.

The CSI TCP back end driver 328 is communicatively coupled through the Xen Hypervisor layer 316 to a CSI TCP front end driver 332 in kernel space of the third domain 310 running on the second processor 304. Test applications 311 hosted under Linux in the third domain access TCP services through socket calls 330 that communicate with the CSI front-end driver 332. TCP shim code 330 may implement a standard TCP socket interface. In this configuration, the Linux OS running in third domain 310 need not natively provide TCP/IP services, and all processing load associated with such services is offloaded to second domain 308 on a different processor or processor core.

As a result, utilizing a domain, created by a VMM, for network service offload provides a scalable solution that can uniformly provide network QoS for disparate operating systems. The approach herein will scale as more cores are embedded into processors. This approach also will allow a single-core processor to operate with hyper threading as if it had multiple cores.

3. Hierarchical Network Stack Offload

According to an embodiment, an I/O-networking stack runs on one core of a multi-core processor and offloads network, block, and file functions from one or more guest operating systems running in a virtual machine environment on that system. The I/O-networking stack is extended to allow multiple systems, which are running the I/O-networking stack in a cluster, the ability to further share offload functions for a set of network and devices presented in the network.

In an embodiment, a hierarchical stack architecture is provided in which components of the stack in the host systems are connected through an Infiniband network or a data center Ethernet (DCE) network to stack components that are resident in one or more gateway devices. Network, block and file functions use this network to create an interface for communicating data and control information between the host and gateway stacks. Infiniband and DCE are merely two examples of communications protocols that may be used for communications in the hierarchical stack architecture. Alternatively, gigabit Ethernet or Fibre Channel could be used.

The I/O-networking stack components in the host systems handle offload for all locally connected networks and devices. For example, a TCP stream utilizing a local gigabit Ethernet port on the host is offloaded solely by the I/O-networking stack residing on that host. Similarly, block devices that are accessible through a Fibre Channel port on the host are offloaded solely by the I/O-networking stack on that host.

Figure 6:
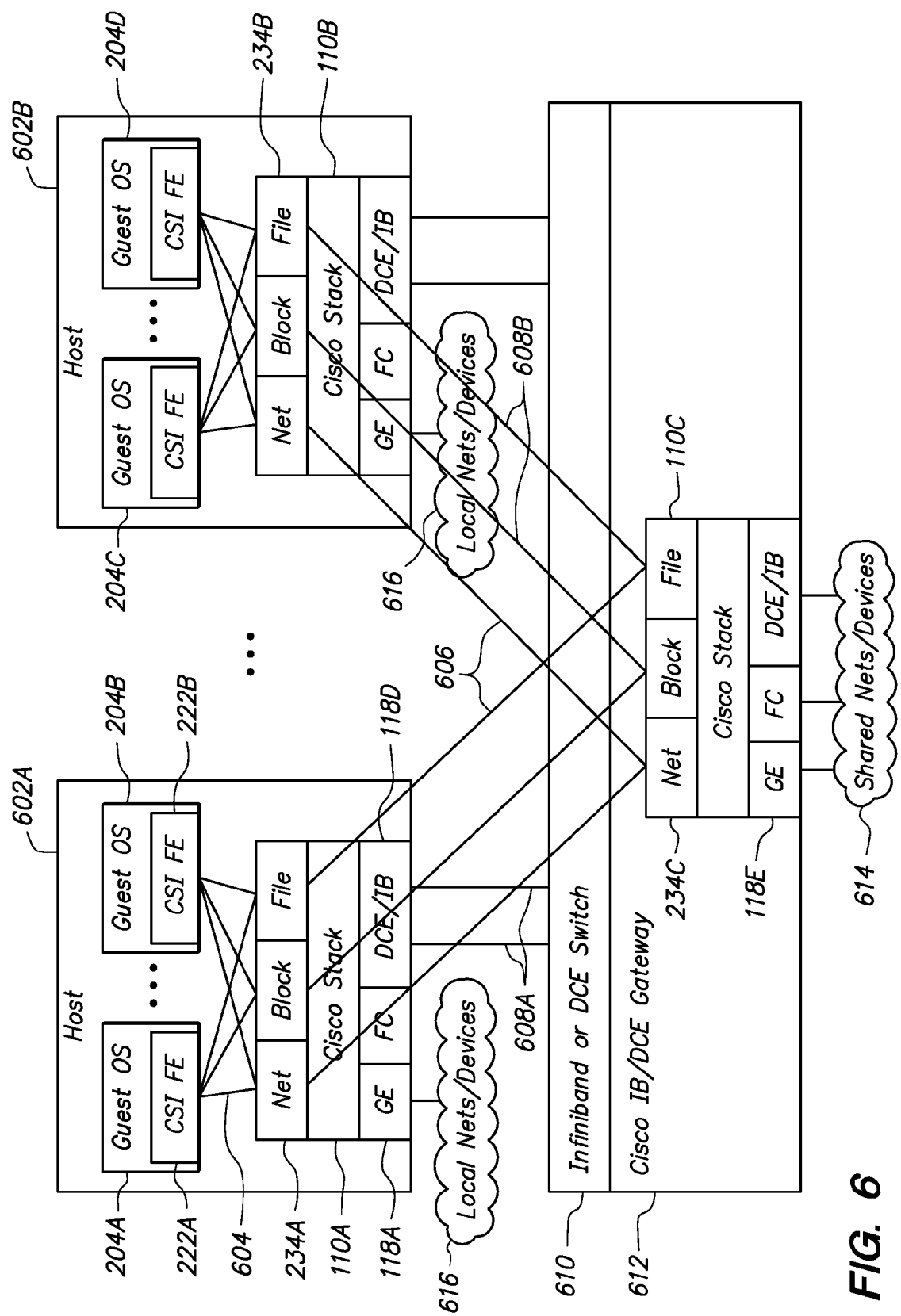
FIG. 6 is a block diagram showing a hierarchical I/O-networking stack system.

FIG. 6 is a block diagram showing a hierarchical I/O-networking stack system. One or more hosts 602A, 602B each host one or more guest operating systems 204A, 204B, 204C, 204D and respective I/O-networking stacks 110A, 110B. The internal arrangement of elements in hosts 602A, 602B is comparable to the arrangement shown in FIG. 2B. Thus, each of the hosts 602A, 602B provides links between stack interface front ends and stack interfaces of the I/O-networking stack. For example, referring to host 602A, links 604 connect stack interface front ends 222A, 222B and stack interfaces 234 of the I/O-networking stack 110A. The I/O-networking stack 110A provides a plurality of external interfaces to networking and storage elements, such as gigabit Ethernet interface 118A. Such interfaces of hosts 602A, 602B may connect to networks or devices 616 that are local to the hosts 602A, 602B.

In addition, each of the hosts 602A, 602B provides the option of at least one interface 118D, such as an Infiniband or DCE interface, which connects on links 608A to a separate host that runs an entirely separate I/O-networking stack at a separate hierarchical layer. For example, links 608A couple a DCE or Infiniband interface 118D of host 602A to an Infiniband or DCE switch 610 that hosts a gateway 612. The gateway 612 hosts an I/O-networking stack 110C that is generally identical in internal arrangement to I/O-networking stacks 110A, 110B. The I/O-networking stack 110C of the gateway has one or more interfaces 118E that are coupled to networks or devices 614 that may be shared across all the hosts 602A, 602B.

Further, in this arrangement, stack interface 234A of I/O-networking stack 110A forms a logical connection indicated by links 606 to a similarly structured stack interface 234C of the I/O-networking stack 110C of the gateway. Individual interfaces within stack interface 234A, such as network, block, and file interfaces, are logically coupled to corresponding individual interfaces in stack interface 234C. Concurrently, other links 606 couple stack interface 234B of I/O-networking stack 110B in a logical connection to the stack interface 234C of the I/O-networking stack 110C of the gateway.

Links 606 represent an offloading of the functions of I/O-networking stacks 110A, 110B to corresponding functions in I/O-networking stack 110C. Thus, in this arrangement, a higher-layer stack such as I/O-networking stack 110A handles local devices and local functions among the resident Guest OSes, but passes requests for shared network, block and file accesses directly to the gateway 612, where such requests are processed by I/O-networking stack 110C. Such requests and other interface functions may be passed directly over Infiniband or DCE connections. The I/O-networking stack 110C handles all shared networks and devices on behalf of an entire group or cluster of hosts. The shared networks and devices 614 may include, for example, distributed file systems, file caching, block caching, NAPT, VPN processing, etc.

In an embodiment, other networks and devices may be connected to an endpoint that is acting as a gateway device. In such an embodiment, the I/O-networking stack hosted on the gateway provides offloaded functions for the remotely connected host systems. For example, a TCP stream utilizing a gigabit Ethernet port on a gateway is offloaded by the I/O-networking stack on that gateway. The interface between the guest OS on the host and the local I/O-networking stack is extended across the Infiniband/DCE network to the I/O-networking stack on the gateway. Likewise, devices accessible to the gateway over a Fibre Channel port on that gateway are available to the remote hosts by extending the block interface between the guest OS and the I/O-networking stack on that host to the stack components on the gateway.

Other functions that could be provided by the I/O-networking stack hosted at a gateway include distributed file systems, file and block caching, NAPT, and VPN. Further, switch 610 and gateway 612 are identified merely as examples of devices separate from hosts 602A, 602B that could host the I/O-networking stack 110C. In other embodiments, any other suitable data processing device could host the I/O-networking stack 110C and form a hierarchical network offload system.

Thus, an apparatus provides hierarchical stack offloading for network, file, and block functions, using Infiniband or DCE to extend the interfaces between guest operating systems and the I/O-networking stack to reach stack components that are placed in gateway systems in a network. This approach may be useful, for example, when data processing resources consumed by either of the local I/O-networking stacks 110A, 110B is sufficiently high that there is a need or preference to move the associated computational burden to a separate device. Similar to how many guest OS's could share amortize a shared stack on a single host, in a hierarchical model this is repeated on a gateway, including dynamically balancing processing back and forth between the gateway and endpoints.

In prior approaches, offloads typically are implemented using specialized network interface cards. In contrast, the approach herein extends the offload capability to utilize multiple CPUs or processor cores in the network. In addition, offloading I/O-networking functions from host operating systems to the specialized I/O-networking stack provides more control within the I/O-networking stack over endpoint switching and networking behavior, provides visibility into application traffic, and provides more flexibility in implementing endpoint-driven intelligent networking features.

4. Additional Offload Services

In one embodiment, I/O-networking stack 110 also includes a cluster failover module that can detect failures or unavailability of network devices, storage systems, and file systems. Further, from the foregoing description it is apparent that I/O-networking stack 110 maintains information indicating all network, block and file connectivity to such resources. The cluster failover module provides failover services to guest OS systems that are running in virtualized domains. Thus, each guest OS need not provide a native failover service and can rely on I/O-networking stack 110 to detect, for example, a failure of one storage system in a cluster and fail over to a standby or backup storage system. Further, the cluster failover services can manage failover to a standby CPU or standby CPU core if a failure occurs in an active CPU or active CPU core that is running the guest OS.

Because the I/O-networking stack 110 runs under a virtualization engine such as Xen, VMWare, etc., the I/O-networking stack can acquire information about the memory requirements for each guest OS. The I/O-networking stack 110 may use such information to manage cluster failover services, for example, to select a standby CPU or standby CPU core from among a pool of available CPU resources and having enough memory to properly service the guest OS and its applications. Thus, in response to a failure of a CPU or core that is hosting a guest OS, the I/O-networking stack 110 may move the guest OS to other hardware that is best configured to support the guest OS.

In an embodiment, cluster failure services are provided by running NuSpeed's HA or Veritas Cluster Server as part of I/O-networking stack 110.

In another embodiment, I/O-networking stack 110 includes a backup module that offloads file backup services from guest operating systems. Because the I/O-networking stack 110 processes all file and block requests of a guest OS, the I/O-networking stack maintains information about open files and the state of caches that are used to satisfy file and block requests. Using this information, the I/O-networking stack 110 can perform scheduled file and block backups to backup storage devices, or perform continuous backup to a standby storage device.

C. Implementation Mechanisms—Hardware Overview

Figure 7:
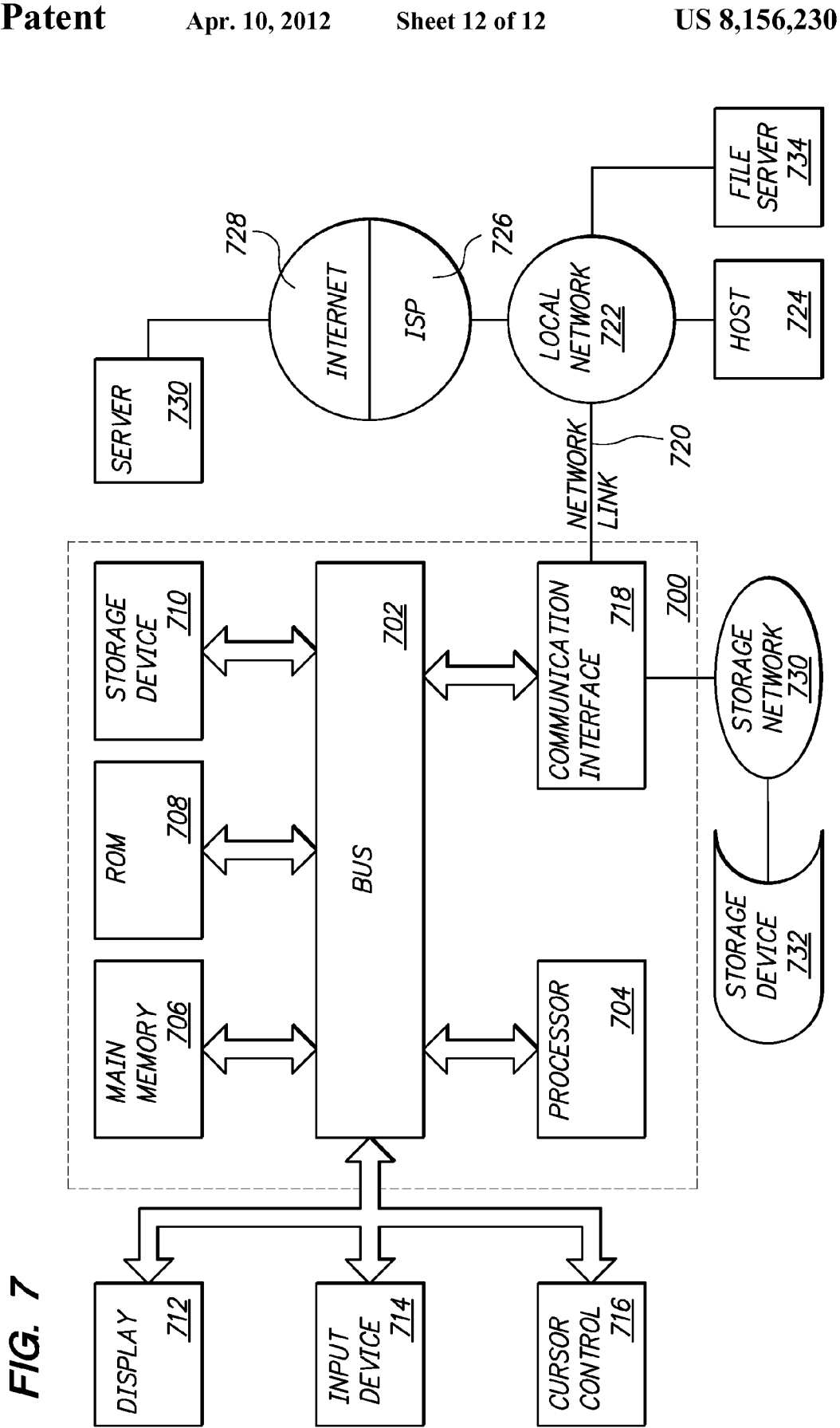
FIG. 7 is a block diagram that illustrates a computer system upon which an embodiment may be implemented.

FIG. 7 is a block diagram that illustrates a computer system 700 upon which an embodiment of the invention may be implemented, subject to the arrangements shown in the preceding drawing figures. Thus, computer system 700 broadly represents a general-purpose data processing host that may be used as a basis for any of the foregoing embodiments.

Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

In various embodiments, processor 704 may comprise a plurality of processors, as in a multi-processor server computer. Further, each processor may have one or more separate processor cores that are capable of independently running operating systems and applications. Thus, processor 704 in FIG. 7 broadly represents a central processing element that may comprise multiple processors and cores in various embodiments.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for network stack offloading approaches. According to one embodiment of the invention, network stack offloading approaches are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724, an external file server 734, or to data equipment operated by an Internet Service Provider ("ISP") 726. File server 734 holds any form of data files, electronic documents, graphics, or other content and resources. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Communication interface 718 also is coupled to a storage network 730 that includes one or more storage devices 732. Storage network 730 may use SCSI, Fibre Channel, or other protocols for communication storage devices and communication interface 718, and may also use other storage area network (SAN) protocols and standards.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for network stack offloading approaches as described herein.

The received code may be executed by processor 704 as it is received, and/or stored in storage device 710, or other non-volatile storage for later execution. In this manner, computer system 700 may obtain application code in the form of a carrier wave.

D. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
one or more external network interfaces that are configured for coupling to one or more networks for receiving and sending packet flows;
one or more processors;
one or more non-transitory computer-readable media storing an input/output networking stack that is shared with two or more operating systems hosted by two or more remote hosts, wherein the input/output networking stack comprises one or more sequences of instructions which, when executed by the one or more processors, cause:
receiving, at a plurality of internal interfaces, requests for data transfers from two or more input/output networking stacks that are respectively configured on the two or more remote hosts, wherein the plurality of internal interfaces comprises a network interface, a block storage interface, and a file system interface; wherein the block storage interface mediates calls from the two or more operating systems; and
permitting the data transfers between the plurality of internal interfaces and at least one external network interface by preventing the two or more input/output networking stacks on the two or more remote hosts from performing the data transfers and performing the data transfers on behalf of the two or more input/output networking stacks on the two or more remote hosts.

2. The apparatus of claim 1, wherein the one or more processors each comprise one or more processor cores; wherein the one or more non-transitory computer-readable media further comprise instructions which, when executed, cause executing the input/output networking stack on at least one virtual machine hosted on a processor core of the one or more processors cores.

3. The apparatus of claim 1, wherein the one or more processors each comprise one or more processor cores; wherein the one or more non-transitory computer-readable media further comprise instructions which, when executed, cause executing the input/output networking stack on a separate operating system hosted on a processor core of the one or more processors cores.

4. The apparatus of claim 1, wherein the input/output networking stack further comprises instructions which, when executed by the one or more processors, cause: preventing the two or more input/output networking stacks on the two or more remote hosts from performing bridging, switching and routing of data between the two or more remote hosts; and bridging, switching and routing data between the two or more remote hosts on behalf of the two or more input/output networking stacks on the two or more remote hosts.

5. The apparatus of claim 1, further comprising instruction which when executed cause the two or more operating systems, on a particular host of the two or more remote hosts, to use operating system drivers to share a particular input/output networking stack, of the two or more input/output networking stacks, that is configured on the particular host.

6. The apparatus of claim 1, wherein the input/output networking stack further comprises instructions which, when executed by the one or more processors, cause:
analyzing data in the data transfers prior to transferring the data between said at least one external network interface and the two or more input/output networking stacks on the two or more remote hosts, wherein analyzing the data comprises comparing properties of the data against security policies, and
preventing transfers of data that does not satisfy the security policies.

7. The apparatus of claim 1, wherein the apparatus is configured as a gateway device that uses the input/output networking stack to provide offloading of network functions, block storage functions, and file system functions to the two or more operating systems that are configured on the two or more remote hosts.

8. The apparatus of claim 1, wherein the two or more input/output networking stacks on the two or more remote hosts are configured in a cluster.

9. The apparatus of claim 1, wherein the input/output networking stack is communicatively connected to the two or more input/output networking stacks on the two or more remote hosts over an internal network that is one of an Infiniband network and a data center ethernet (DCE) network.

10. The apparatus of claim 1, wherein the apparatus is one of a router and a switch.

11. A non-transitory computer-readable storage medium storing one or more sequences of instructions wherein the one or more sequences of instructions comprise instructions which, when executed by a computing device, cause the computing device to perform:
receiving, at a plurality of internal interfaces, requests for data transfers from two or more input/output networking stacks that are shared with two or more operating systems hosted by two or more remote hosts, and that are respectively configured on the two or more remote hosts, wherein the plurality of internal interfaces comprises a network interface, a block storage interface, and a file system interface; wherein the block storage interface mediates calls from the two or more operating systems;
permitting the data transfers between the plurality of internal interfaces and at least one external network interface by preventing the two or more input/output networking stacks on the two or more remote hosts from performing the data transfers and performing the data transfers on behalf of the two or more input/output networking stacks on the two or more remote hosts.

12. The non-transitory computer-readable storage medium of claim 11, wherein the one or more sequences of instructions further comprise instructions which, when executed, cause executing the input/output networking stack on at least one virtual machine hosted on a processor core of a processor on the computing device.

13. The non-transitory computer-readable storage medium of claim 11, wherein the one or more sequences of instructions further comprise instructions which, when executed, cause executing the input/output networking stack on a separate operating system hosted on a processor core of a processor on the computing device.

14. The non-transitory computer-readable storage medium of claim 11, wherein the one or more sequences of instructions for the input/output networking stack further comprise instructions which, when executed, cause: preventing the two or more input/output networking stacks on the two or more remote hosts from performing bridging, switching and routing of data between the two or more remote hosts; and bridging, switching and routing data between the two or more remote hosts on behalf of the two or more input/output networking stacks on the two or more remote hosts.

15. The non-transitory computer-readable storage medium of claim 11, wherein the two or more operating systems, on a particular host of the two or more remote hosts, use operating system drivers to share a particular input/output networking stack, of the two or more input/output networking stacks, that is configured on the particular host.

16. The non-transitory computer-readable storage medium of claim 11, wherein the one or more sequences of instructions for the input/output networking stack further comprise instructions which, when executed, cause:

analyzing data in the data transfers prior to transferring the data between said at least one external network interface and the two or more input/output networking stacks on the two or more remote hosts, wherein analyzing the data comprises comparing properties of the data against security policies, preventing transfers of data that does not satisfy the security policies.

17. The non-transitory computer-readable storage medium of claim 11, wherein the computing device is configured as a gateway device that uses the input/output networking stack to provide offloading of network functions, block storage functions, and file system functions to the two or more operating systems that are configured on the two or more remote hosts.

18. The non-transitory computer-readable storage medium of claim 11, wherein the two or more input/output networking stacks on the two or more remote hosts are configured in a cluster.

19. The non-transitory computer-readable storage medium of claim 11, wherein the one or more sequences of instructions for the input/output networking stack further comprise instructions which, when executed by the one or more processors, cause the input/output networking stack to connect to the two or more input/output networking stacks on the two or more remote hosts over an internal network that is one of an Infiniband network and a data center ethernet (DCE) network.

20. The non-transitory computer-readable storage medium of claim 11, wherein the computing device is one of a router and a switch.

* * * * *